United States Patent [19]
McGill et al.

[11] Patent Number: 5,984,581
[45] Date of Patent: Nov. 16, 1999

[54] PIPELINE COATING

[75] Inventors: James C. McGill, Tulsa; James M. McGill, Broken Arrow; Bobby L. Key, Tulsa, all of Okla.

[73] Assignee: B.L. Key Services, L.L.C., Tulsa, Okla.

[21] Appl. No.: 08/877,358

[22] Filed: Jun. 17, 1997

[51] Int. Cl.$^6$ ........................................................ F16L 1/04
[52] U.S. Cl. ........................ 405/172; 405/157; 138/146
[58] Field of Search ............................... 405/157, 158, 405/172, 154; 138/145, 146, 175

[56] References Cited

U.S. PATENT DOCUMENTS

| | | | |
|---|---|---|---|
| 3,799,208 | 3/1974 | Ells | 138/175 |
| 4,338,044 | 7/1982 | Titus | 405/172 |
| 4,395,159 | 7/1983 | Karuks et al. | 405/172 |
| 4,449,852 | 5/1984 | Muszynski . | |
| 4,606,378 | 8/1986 | Meyer | 405/177 |
| 4,880,335 | 11/1989 | Lee . | |
| 5,476,343 | 12/1995 | Sumner | 405/157 |

*Primary Examiner*—David Bagnell
*Assistant Examiner*—Frederick L. Lagman
*Attorney, Agent, or Firm*—Crowe & Dunlevy

[57] ABSTRACT

Method and apparatus for weighting pipe segments of the type that are interconnected to form a pipeline for transporting fluids such as natural gas and the like. The exterior surface of each segment is wetted with a friction reducing agent prior to forming a coating of weighting material along the length of the pipe segment, the friction reducing agent selected to prevent the adhering of the weighting material to the pipe. In the preferred embodiment, where a medial portion of the pipe segment is wrapped with an adhesive material prior to wetting the remaining portion of the pipe segment's external surface with the friction reducing agent, and encasing same with the weighting material. Preferably, the adhesive material is joint tape, the friction reducing agent is vegetable oil, and the weighting material is concrete.

29 Claims, 2 Drawing Sheets

PIPELINE COATING

BACKGROUND OF THE INVENTION

1. Field of the Invention

The present invention relates to the field of pipeline construction, and more particularly, but not by way of limitation, to an apparatus and method related to the weighting of pipelines to maintain negative buoyancy in buried or submersion conditions.

2. Discussion

It is known that a pipeline transporting a gas, such as natural gas, will becomes buoyant where portions of the pipeline resides in water or in the ground where the water level of the soil rises above the pipe. Floating of any portion of the pipeline is undesirable as such tends to damage corrosion coatings and may damage the pipe. As a result of this, the pipeline construction industry has adopted standards for avoiding buoyancy by attaching concrete weights to the pipe. This is sometimes referred to as maintaining pipeline negative buoyancy.

In the past, concrete weights for pipelines were generally of two kinds: (1) the set-on type; and (2) the bolt-on type. The set-on type of weight is a block of concrete with a space in the bottom dimensioned to fit over a pipe when the weight is set on the pipe. The bolt-on type of weight has two substantially identical blocks of concrete with each having a space dimensioned to fit a pipe; the two blocks are bolted together to permanently attach to the pipe.

With the advent of off-shore gas development, an alternative method of providing pipeline weighting arose which involved encasing a pipe in a thin coating of concrete. The concrete coating was applied by a coating machine (there are a variety of designs commercially available), or by molding a coating on the pipe using appropriately constructed forms. At the current time, concrete coated steel pipe can be found throughout many regions of the world.

In recent years, high density polyethylene pipe has become popular both in the construction of low pressure natural gas transmission pipelines and for water and other liquid transmissions pipelines. Unlike steel, polyethylene is not as dense as water and will float. Thus, a pipeline constructed of polyethylene pipe must be weighted to prevent floatation when transporting most liquids, including water.

Polyethylene has a substantially different coefficient of thermal expansion than steel and concrete. Thus, polyethylene will expand or contract with an increase or decrease of temperature more than will concrete or steel for the reason that concrete and steel have similar coefficients of thermal expansion. This differential in thermal expansion has resulted in problems when continuous concrete coating is applied to polyethylene pipe.

There has been a need to improve the quality of concrete coating on a polyethylene pipe and the like to prevent the numerous problems associated therewith, and this is that to which the present invention is directed.

SUMMARY OF THE INVENTION

The present invention provides a method and apparatus for weighting pipe segments to decrease buoyancy, such pipe segments being interconnectable to form a continuous pipeline for transporting fluids such as natural gas and the like. The exterior surface of each pipe segment to be weighted is wetted with a friction reducing agent, and the external surface is encased with a coating of weight material on the pipe segment. The friction reducing agent is selected to prevent the adhering of the weighting material to the pipe segment.

In the preferred embodiment, a medial portion of the pipe segment is wrapped with an adhesive material (joint tape, for example) prior to wetting the remaining portion of the pipe segment's external surface with the friction reducing agent and coating same with the weighting material. Preferably, the friction reducing agent is vegetable oil and the weighting material is concrete.

It is an object of the present invention to provide a method and apparatus for weighting a plastic pipe or the like so as to preserve the integrity of the weighting material over a range of ambient temperature changes.

Other objects, advantages and features of the present invention will be apparent from the following description when read in conjunction with the accompanying drawings and appended claims.

Figure 1:
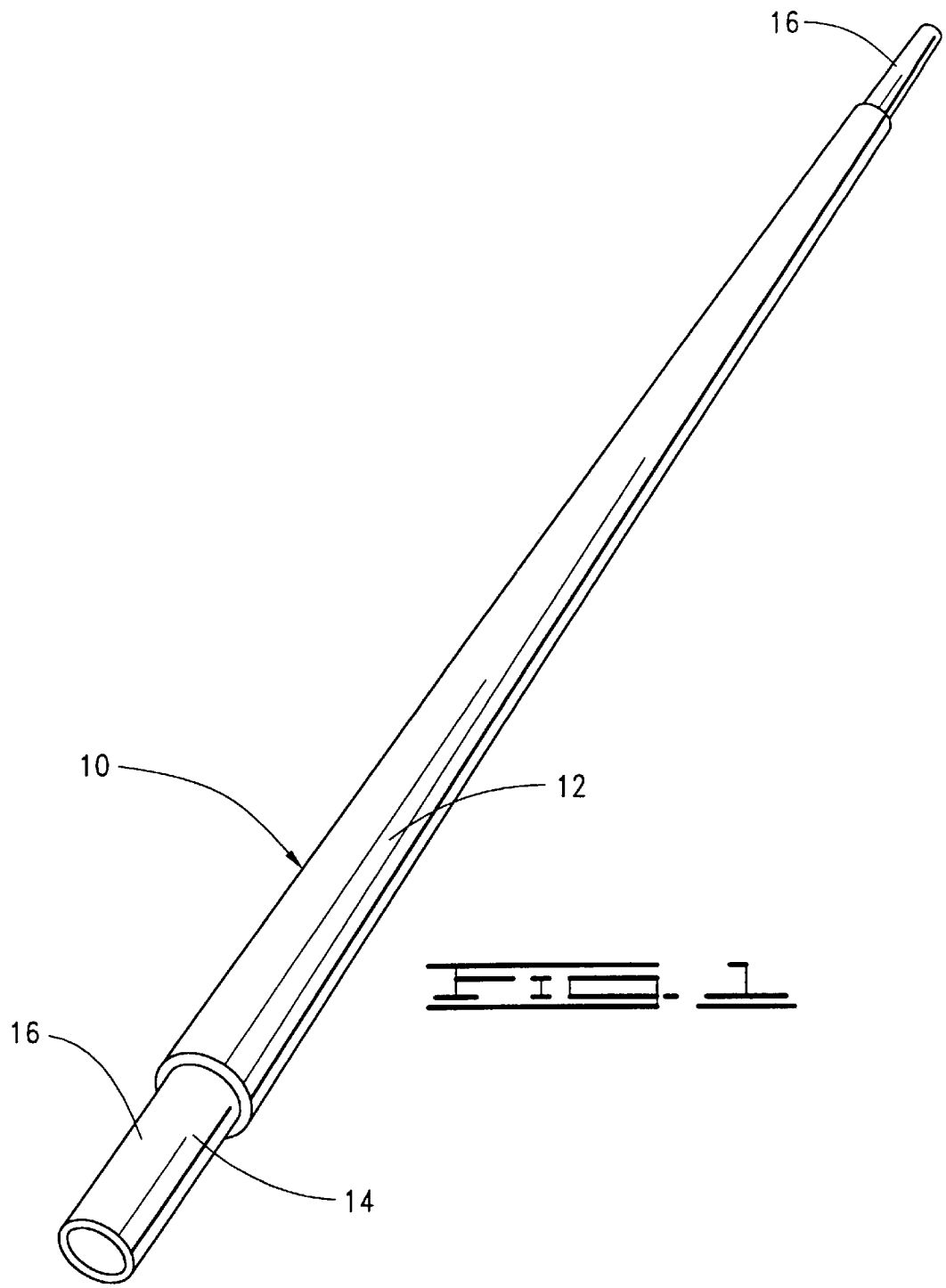
FIG. 1 is a perspective view of a weighted pipe segment constructed in accordance with the present invention.

The drawings are illustrative of the principles of the invention, but since numerous modifications and changes will readily occur to those skilled in the art, it is not desired that the present invention be limited to the exact construction and operation shown and described herein, and accordingly, all suitable modifications and equivalents may be resorted to while falling within the scope of the invention.

DESCRIPTION

As discussed briefly hereinabove, the difficulties brought about by the difference of thermal expansion between that of polymeric plastic material and that of concrete are exacerbated by the stress characteristics of concrete. While concrete exhibits excellent compressive strength it has very poor tensile strength. Therefore, when a plastic pipe such as polyethylene is weight coated with concrete, the rise in temperature of the concrete during curing results in expansion of the concrete and the polyethylene along both the length and circumference of both the pipe and the concrete coating. Handling of the concrete coated pipe while tensile stress exists within the concrete can result in spalling of the concrete, causing substantial cracks that can reach the surface of the pipe.

Because polyethylene expands much more per degree of temperature rise than does concrete, stress is imparted circumferentially within the concrete coating. This circumferential stress can be dealt with by increasing the amount of reinforcing steel disposed within the concrete. It has been found that welded wire mesh properly applied under normal industry standards can prevent spalling of the concrete due to such circumferential stress.

However, longitudinal stress presents a more difficult challenge. Because the concrete tends to bond to the polyethylene, and longitudinal growth is much greater than circumferential growth, the concrete coating is pulled apart near the center of the pipe at a point where the reinforcing steel overlaps. This can result in cracks ranging in size up to several inches wide, with failure often occurring at the tie points of the reinforcing steel.

These same stress related problems can occur after installation of a pipeline constructed of concrete coated polyethylene pipe when there is a temperature change of the fluid transported by the pipeline. Experience has shown that these stress related problems can occur repeatedly throughout the life time of the pipeline rather than just during application of the concrete coating to the pipe segments.

Early attempts at increasing the strength of a weight coating of concrete by the application of internally disposed reinforcing steel has not alleviated the longitudinal stress problem. Consequently, efforts were directed to the reduction of the friction between the concrete coating and the polyethylene pipe.

It was discovered that a pretreatment of the exterior surface with a layer of oil reduced the friction between the concrete coating and the polyethylene pipe, and almost entirely prevented the bonding of the concrete to the exterior surface. Because the oil needed to be insoluble in water and environmentally safe, it was found that the application of a layer of inexpensive vegetable oil on the exterior surface of the polyethylene pipe addressed the problem suitably. Again, this oil treatment of the external surface prevented the concrete from bonding to the polyethylene pipe during curing, and it tended to reduce the friction between the concrete and the pipe after curing. Thus, the polyethylene pipe could slip essentially friction free within the concrete coating so that longitudinal stress was not imparted to the concrete.

While the pretreatment of the external surface of the polyethylene pipe eliminated the longitudinal stress in the concrete, it created a situation which was not always satisfactory. The concrete coating was free to slip along the length of the polyethylene pipe rather than remaining in place. Since it is customary to leave portions of the pipe ends bare of the concrete coating (to enable the interconnection of pipe segments to form a continuous pipeline), the free movement of the concrete coating along the polyethylene pipe is undesirable. A method of locking the concrete coating in place on the polyethylene pipe was needed that did not result in longitudinal stress.

The slippage of the concrete coating along the polyethylene pipe was solved by applying several wraps of a joint wrap tape (a tape that is used to cover field weld joints in the pipeline industry) at a medial portion of the pipe, preferably at or near the center of the pipe. Following the wrapping of the joint wrap tape about the mid-point of the pipe segment, the external surface of the pipe was wetted with oil, and the remaining portion (less the bare ends) was coated with concrete. Upon curing, the concrete coating adheres to the fixed wrappings of the joint wrap tape, and since the joint wrap tape is bonded to the polyethylene pipe, the concrete coating is anchored to the center point of the pipe, preventing the longitudinal movement of the concrete coating on the pipe.

In essence, the wrapping of the joint wrap tape (which is usually about 35 mils thick) at or near the center of the pipe results in an elevated surface at the center of the pipe joint against which the concrete coating butts and to which the concrete bonds. This prevents longitudinal movement of the concrete coating, resulting in the concrete coating being fixed relative to the center of the pipe.

Figure 2:
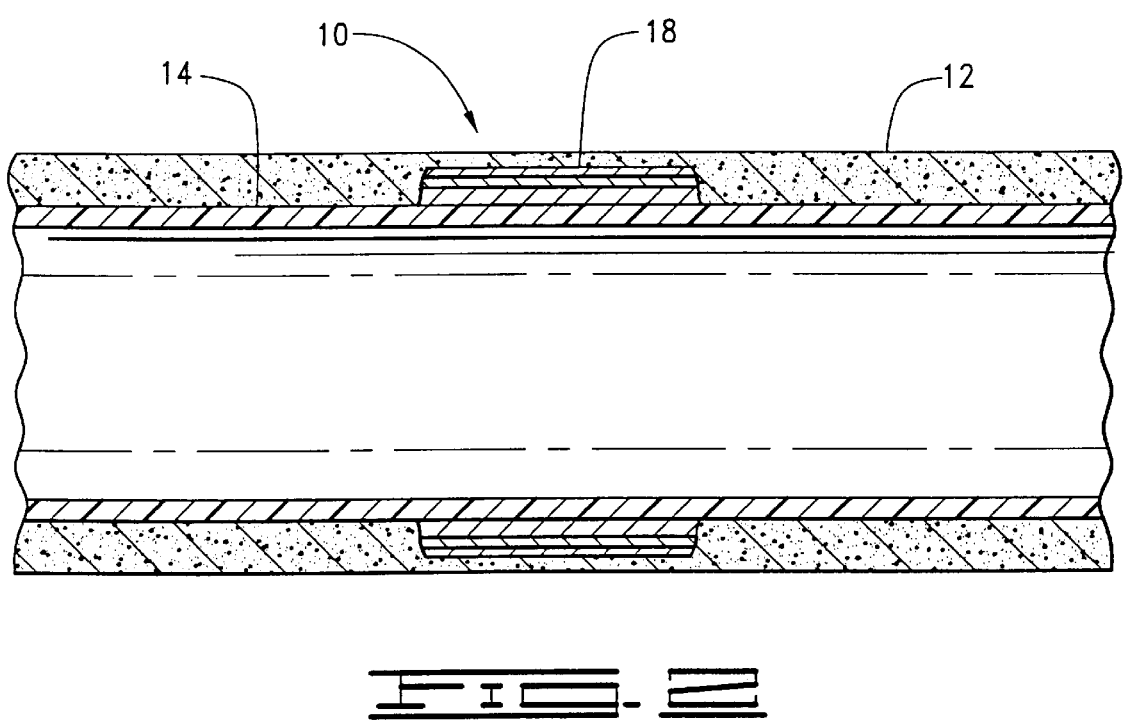
FIG. 2 is a cross-sectional view of the weighted pipe segment of FIG. 1.

Referring now to FIGS. 1 and 2, shown therein is a portion of a weighted pipe segment 10 constructed in accordance with the present invention. In practice, segments of such pipe, usually made of polyethylene, can range up to 40 feet in length and longer as typically used in the construction of pipelines, with the ends thereof being interconnected such as by welding to form a continuous string of pipe segments.

An encasement sleeve 12 is formed about a plastic pipe segment 14, the encasement sleeve 12 extending substantially the entire length of the pipe segment 14. The end portions 16 are left free of the encasement sleeve 12 for a selected length for the purpose of providing interconnectable joints for joining the plastic pipe segment 14 end to end with other like plastic pipe segments.

FIG. 2 shows a cross section of a medial portion of the weighted pipe segment 10. An adhesive material 18 has been applied thereto for the purpose of adhering the encasement sleeve 12 to the underlying plastic pipe segment 14. It has been found that one good adhesive material to use in practicing the present invention is conventional joint tape of the type commonly used in the industry.

Once the adhesive material 18 has been applied (it will be understood that the number and positions along the plastic pipe segment where the adhesive material 18 is applied can vary as desired to practice the present invention), the external surface of the plastic pipe 14 is wetted with a friction reducing agent, such as the vegetable oil mentioned hereinabove. Then the plastic pipe 14 is coated with a continuous concrete coating to form the encasement sleeve 12, using any conventional coating method. The result is that the encasement sleeve 12 formed by the concrete coating is adhered to the adhesive material 18 and thus the encasement sleeve 12 is thereby anchored to the plastic pipe segment 14 near its medial portion (and at every location that the adhesive material 18 is applied).

The result of this is that the encasement sleeve 12, anchored only at the location or locations of the application of the adhesive material 18, is free to otherwise thermally expand and contract along the length of the plastic pipe segment 14 since the application of the friction reducing agent permits independent movements of the encasement sleeve and the plastic pipe 14 except at the locations of the adhesive material 18. This results in a weight coated pipe segment that has a substantially free of longitudinal stress.

The coated pipe segment 10 can be interconnected with a plurality of similarly produced pipe segments to construct a concrete coated pipeline. The relatively short length of end portion 16 of the plastic pipe 14 of the encasement sleeve 12 (the concrete coating) at each end of the weighted pipe segment 10 (normally about 12 inches of length from each end) is left bare, and after welding of the weighted pipe segment 10 to another like segment, the uncoated portions of the joined pipe sections can be concrete coated or left bare, depending on the application.

If the uncoated portions at the ends of the joined pipe segments are to be protected by the application of a concrete coating, provision for expansion of the pipe segments must be allowed. This can be achieved by using a non-hardening cement for this end portion coating; or by leaving a space gap to allow for the expansion; or by providing a conventional industrial expansion joint.

It is clear that the present invention is well adapted to carry out the objects and to attain the ends and advantages mentioned as well as those inherent therein. While a presently preferred embodiment of the invention has been described for purposes of the disclosure, it will be understood that numerous changes may be made which will readily suggest themselves to those skilled in the art and which are encompassed within the spirit of the invention disclosed and as defined in the appended claims.

What is claimed is:

1. A method of weighting a pipe to decrease the buoyancy of the pipe for use in a pipeline, comprising the steps of:

wetting the exterior surface of the pipe with a friction reducing agent; and encasing the exterior surface and friction reducing agent to form a coating of a weighting material on the pipe, the friction reducing agent selected to prevent adhering of the weighting material to the pipe so that longitudinal stress on the weighting material is substantially diminished.

2. The method of claim 1 wherein the weighting material comprises concrete.

3. The method of claim 2 wherein the pipe is made of a polymeric material.

4. The method of claim 3 wherein the polymeric material comprises polyethylene.

5. The method of claim 4 wherein the friction reducing agent comprises an oil.

6. The method of claim 5 wherein the oil comprises vegetable oil.

7. A method of forming a pipeline of weighted pipe segments that are interconnected to form the pipeline, the method comprising the steps of:

wetting at least a medial portion of the exterior surface of each pipe segment with a friction reducing agent;

encasing the medial portion of the exterior surface of each segment of pipe and the friction reducing agent thereon to form an encasement sleeve of a weighting material on the pipe at the medial portion, the friction reducing agent selected to prevent adhering of the encasement sleeve to the pipe so that longitudinal stress on the weighting material is substantially diminished; and interconnecting the weighted pipe segments to form the pipeline.

8. The method of claim 7 wherein the weighting material comprises concrete.

9. The method of claim 8 wherein each pipe segment is made of a polymeric plastic material.

10. The method of claim 9 wherein the polymeric plastic material is polyethylene.

11. The method of claim 10 wherein the friction reducing agent comprises an oil.

12. The method of claim 11 wherein the oil is vegetable oil.

13. A method of constructing a weighted pipe segment used in the construction of a pipeline, the method comprising the steps of:

wrapping at least one medial portion of the pipe segment with a protective coating;

wetting substantially the remaining portion of the pipe segment with a friction reducing agent; and encasing the exterior surface, the friction reducing agent and the protective coating to form a weighting material about a selected length of the pipe segment, the friction reducing agent selected to prevent adhering of the weighting material to the pipe segment so that longitudinal stress on the weighting material is substantially diminished, and the protective coating selected so that the weighting material adheres thereto thereby affixing the weighting material to the medial portion of the pipe segment.

14. The method of claim 13 wherein the protective coating in the step of wrapping the medial portion comprises an adhesive coated tape.

15. The method of claim 14 wherein the weighting material comprises concrete.

16. The method of claim 15 wherein the pipe is made of a polymeric material.

17. The method of claim 16 wherein the polymeric material comprises polyethylene.

18. The method of claim 17 wherein the friction reducing agent comprises an oil.

19. The method of claim 18 wherein the oil comprises vegetable oil.

20. The method of claim 19 wherein a portion of the pipeline segments at each uncoated end thereof is protected during the encasing step so that said uncoated end portions are free of the weighting material, the method further comprises:

repeating the steps of claim 14 to produce a plurality of coated pipeline segments;

wetting the uncoated end portions of the interconnected segments on the exterior surfaces thereof with the friction reducing agent; and encasing the exterior surfaces of the uncoated end portions and the friction reducing agent thereon to form a coating of a weighting material at the joints of the pipe segments so that the pipeline is substantially continuously coated by the weighting material, the friction reducing agent allowing substantially diminished longitudinal stress on the weighting material at the joints.

21. The method of claim 20 wherein the weighting material in the encasing of the uncoated end portions comprises concrete.

22. The method of claim 21 wherein the friction reducing agent in the encasing of the uncoated end portions comprises an oil.

23. The method of claim 22 wherein the oil in the encasing of the uncoated end portions comprises vegetable oil.

24. A weighted pipe segment for interconnection in the construction of a pipeline, the weighted pipe segment comprising:

a pipe segment; and an encasement sleeve extending substantially the length of the pipe segment, the encasement sleeve adhering to a medial portion of the pipe segment and the encasement sleeve free to thermally expand along the length of the pipe segment without substantial resistance thereto by the pipe segment, wherein portions of the pipe segment have a friction reducing means applied thereto for permitting the encasement sleeve to thermally expand along the length of the pipe segment.

25. The weighted pipe segment of claim 24 wherein the weighting material comprises concrete.

26. The weighted pipe segment of claim 25 wherein the pipe segment is made of a polymeric material.

27. The weighted pipe segment of claim 26 wherein the polymeric material comprises polyethylene.

28. The weighted pipe segment of claim 27 wherein the friction reducing means comprises a vegetable oil.

29. The weighted pipe segment of claim 28 wherein a portion of the pipeline segment at each end thereof is free of the encasement sleeve.

* * * * *